(12) United States Patent
Yamane

(10) Patent No.: US 8,733,328 B2
(45) Date of Patent: May 27, 2014

(54) METHOD FOR CONTROLLING OPERATION OF INTERNAL COMBUSTION ENGINE

(75) Inventor: Naruto Yamane, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/391,745

(22) PCT Filed: May 2, 2011

(86) PCT No.: PCT/JP2011/002542
§ 371 (c)(1),
(2), (4) Date: Feb. 22, 2012

(87) PCT Pub. No.: WO2012/150619
PCT Pub. Date: Nov. 8, 2012

(65) Prior Publication Data
US 2014/0046575 A1 Feb. 13, 2014

(51) Int. Cl.
*F02M 25/07* (2006.01)
(52) U.S. Cl.
USPC .............. 123/568.11; 123/568.18; 701/108; 60/605.2
(58) Field of Classification Search
CPC ............... F02M 25/0707; F02M 25/0779
USPC ............ 123/568.11, 568.14, 568.18, 123/568.21–568.32, 559.1, 559.2; 701/108; 60/600, 605.2, 611, 613
See application file for complete search history.

(56) References Cited

U.S. PATENT DOCUMENTS

| | | | | |
|---|---|---|---|---|
| 4,282,713 A | * | 8/1981 | Antoku et al. ................ | 60/600 |
| 5,297,047 A | * | 3/1994 | Matsuno ...................... | 701/107 |
| 5,368,005 A | * | 11/1994 | Kako ........................ | 123/568.16 |
| 5,501,201 A | * | 3/1996 | Miyoshi et al. .......... | 123/568.24 |
| 5,988,147 A | * | 11/1999 | Everingham ............. | 123/568.18 |
| 6,647,972 B2 | * | 11/2003 | Sato et al. ................. | 123/568.16 |
| 7,533,524 B2 | * | 5/2009 | Wang et al. ............... | 60/297 |

FOREIGN PATENT DOCUMENTS

| | | |
|---|---|---|
| JP | A-2004-100497 | 4/2004 |
| JP | A-2005-325811 | 11/2005 |
| JP | A-2007-262902 | 10/2007 |
| JP | A-2009-209724 | 9/2009 |
| JP | A-2010-121568 | 6/2010 |

OTHER PUBLICATIONS

International Search Report mailed Jun. 14, 2011 issued in International Patent Application No. PCT/JP2011/002542 (with translation).
Jun. 26, 2012 Japanese Office Action issued in Japanese Patent Application No. 2011-540244 (with translation).

* cited by examiner

*Primary Examiner* — John Kwon
(74) *Attorney, Agent, or Firm* — Oliff PLC

(57) ABSTRACT

In a method for controlling operation of an engine in which an EGR system is incorporated therein, when the engine is in a pressure-accumulable operational state in which EGR gas can be pressure-accumulated in an EGR passage between an EGR control valve and an on-off valve, these valves are brought into a full closed state, respectively. In addition, when an intake pressure transmitted from an air intake passage to the engine becomes more than or equal to a target value of the intake pressure set based on an operational state of the engine, the on-off valve is switched to a full open state, and then the on-off valve is switched to the full closed state again after elapse of a predetermined time, and high-pressure EGR gas of a low oxygen concentration is temporarily stored in the EGR passage.

20 Claims, 9 Drawing Sheets

METHOD FOR CONTROLLING OPERATION OF INTERNAL COMBUSTION ENGINE

TECHNICAL FIELD

The present invention relates to a method for controlling operation of an internal combustion engine in which the engine is temporarily stopped according to a request for a stop thereof having an exhaust gas recirculation system incorporated therein, and the engine is started again according to a request for a start to the engine.

BACKGROUND ART

There has been known an EGR (Exhaust Gas Recirculation) system in which a part of exhaust gas flowing through an exhaust passage is returned from an air intake passage into a combustion chamber to reduce a combustion temperature of an air-fuel mixture in the chamber, and thereby a percentage of nitrogen oxide in the exhaust gas is reduced. In this EGR system, an EGR control valve capable of opening and closing an EGR passage is interposed in the middle of this EGR passage whose both ends are communicated with the air intake passage and the exhaust passage respectively, and exhaust gas is recirculated to an air intake passage side in a predetermined operating range of the engine.

In recent years, there has been a significant growing social need for purifying exhaust gas, and from such a viewpoint, has also been promoted so-called idle stop control in which actuation of the engine is stopped when a vehicle is stopped, and in which useless emission of carbon dioxide is prevented, and at the same time, useless consumption of fuel is suppressed. However, since effective exhaust gas is not interposed in the EGR passage at the time of restart of the engine in such idle stop control, it is difficult to have exhaust gas contained in an intake air supplied to the combustion chamber with fuel particularly at the beginning of start.

A technology to solve such problem has been proposed in Patent Literature 1. Namely, in idle stop control, the technology is configured such that EGR gas can be temporarily stored in an EGR passage at the time of stop of an internal combustion engine, and that the EGR gas can be supplied particularly to a first explosion cylinder in which fuel supplied first burns in addition to an intake air at the time of restart of the engine.

CITATION LIST

Patent Literature

PTL 1: Japanese Patent Laid-Open No. 2007-262902

SUMMARY OF INVENTION

Technical Problem

In Patent Literature 1, the EGR gas temporarily stored in the EGR passage is a part of exhaust gas of a relatively high oxygen concentration that was flowing through an exhaust passage immediately before stop of the engine, and thus it is essentially difficult to store EGR gas of a low oxygen concentration in the EGR passage. Hence, even though an EGR valve is opened at the time of restart of the engine, it is difficult to reduce an exhaust gas temperature as planned, and as a result, cannot be expected so much an effect of suppressing generation of $NO_x$ at the time of restart of the engine.

An object of the present invention is to provide a method for controlling operation of an internal combustion engine having an exhaust gas recirculation system incorporated therein that can perform proper EGR control also to a first explosion cylinder when restarting the engine in a temporary stopped state.

Solution to Problem

A first aspect of the present invention is a method for controlling operation of an internal combustion engine in which the engine is temporarily stopped according to a request for a stop to the engine having an exhaust gas recirculation system incorporated therein, and the engine is started again according to a request for a start to the engine, wherein the exhaust gas recirculation system includes: an EGR passage for recirculating a part of exhaust gas discharged from the engine to an air intake passage as EGR gas, one end of the EGR passage being communicated with the air intake passage and the other end thereof being communicated with an exhaust passage; an EGR control valve arranged on one end side of the EGR passage for controlling a flow rate of the EGR gas flowing through the EGR passage; and an on-off valve arranged on the other end side of the EGR passage for opening and closing the EGR passage, the method comprising the steps of:

determining whether or not the engine is in a pressure-accumulable operational state in which the EGR gas can be pressure-accumulated in the EGR passage between the EGR valve and the on-off valve;

bringing the EGR valve into a full closed state when it is determined that the engine is in the pressure-accumulable operational state;

comparing a pressure of exhaust gas interposed in the exhaust passage to be led to the EGR passage, and a pressure of the EGR gas interposed in the EGR passage between the EGR valve and the on-off valve after bringing the EGR valve into the full closed state; and bringing the on-off valve into the full closed state when the pressure of the exhaust gas interposed in the exhaust passage to be led to the EGR passage becomes lower than the pressure of the EGR gas interposed in the EGR passage between the EGR valve and the on-off valve.

A second aspect of the present invention is a method for controlling operation of an internal combustion engine in which the engine is temporarily stopped according to a request for a stop to the engine having an exhaust gas recirculation system incorporated therein, and the engine is started again according to a request for a start to the engine, wherein the exhaust gas recirculation system includes: an EGR passage for recirculating a part of exhaust gas discharged from the engine to an air intake passage as EGR gas, one end of the EGR passage being communicated with the air intake passage and the other end thereof being communicated with an exhaust passage; an EGR control valve arranged on one end side of the EGR passage for controlling a flow rate of the EGR gas flowing through the EGR passage; and an on-off valve arranged on the other end side of the EGR passage for opening and closing the EGR passage, the method comprising the steps of:

determining whether or not the engine is in a pressure-accumulable operational state in which the EGR gas can be pressure-accumulated in the EGR passage between the EGR valve and the on-off valve;

bringing the EGR valve into a full closed state when it is determined that the engine is in the pressure-accumulable operational state;

determining whether or not a change rate of a throttle opening is less than a predetermined value after bringing the EGR valve into the full closed state; and bringing the on-off valve into the full closed state when it is determined that the change rate of the throttle opening is less than the predetermined value.

A third aspect of the present invention is a method for controlling operation of an internal combustion engine in which the engine is temporarily stopped according to a request for a stop to the engine having an exhaust gas recirculation system incorporated therein, and the engine is started again according to a request for a start to the engine, wherein the exhaust gas recirculation system includes: an EGR passage for recirculating a part of exhaust gas discharged from the engine to an air intake passage as EGR gas, one end of the EGR passage being communicated with the air intake passage and the other end thereof being communicated with an exhaust passage; an EGR control valve arranged on one end side of the EGR passage for controlling a flow rate of the EGR gas flowing through the EGR passage; and an on-off valve arranged on the other end side of the EGR passage for opening and closing the EGR passage, the method comprising the steps of:

determining whether or not the engine is in a pressure-accumulable operational state in which the EGR gas can be pressure-accumulated in the EGR passage between the EGR valve and the on-off valve;

bringing the EGR valve and the on-off valve into a full closed state, respectively when it is determined that the engine is in the pressure-accumulable operational state;

determining whether or not a change rate of a throttle opening is less than or equal to a predetermined value after bringing the EGR valve and the on-off valve into the full closed state;

switching the on-off valve to a full open state when it is determined that the change rate of the throttle opening is less than or equal to the predetermined value; and switching the on-off valve to the full closed state again after elapse of a predetermined time from switching the on-off valve to the full open state.

A fourth aspect of the present invention is a method for controlling operation of an internal combustion engine in which the engine is temporarily stopped according to a request for a stop to the engine having an exhaust gas recirculation system incorporated therein, and the engine is started again according to a request for a start to the engine, wherein the exhaust gas recirculation system includes: an EGR passage for recirculating a part of exhaust gas discharged from the engine to an air intake passage as EGR gas, one end of the EGR passage being communicated with the air intake passage and the other end thereof being communicated with an exhaust passage; an EGR control valve arranged on one end side of the EGR passage for controlling a flow rate of the EGR gas flowing through the EGR passage; and an on-off valve arranged on the other end side of the EGR passage for opening and closing the EGR passage, the method comprising the steps of:

determining whether or not the engine is in a pressure-accumulable operational state in which the EGR gas can be pressure-accumulated in the EGR passage between the EGR valve and the on-off valve;

bringing the EGR valve and the on-off valve into a full closed state, respectively when it is determined that the engine is in the pressure-accumulable operational state;

setting a target value of an intake pressure transmitted from the air intake passage to the engine based on an operational state of the engine;

comparing the intake pressure transmitted from the air intake passage to the engine and the set target value of the intake pressure;

switching the on-off valve to a full open state when the intake pressure transmitted from the air intake passage to the engine is more than or equal to the set target value of the intake pressure after bringing the EGR valve and the on-off valve into the full closed state; and switching the on-off valve to the full closed state again after elapse of a predetermined time from switching the on-off valve to the full open state.

In the method for controlling operation of the internal combustion engine according to the first or second aspect of the present invention, the step of switching the on-off valve in the full closed state to the full open state may include the steps of:

calculating a target time required for switching the full closed state to the full open state of the on-off valve based on an operational state of the engine; and switching the on-off valve to the full open state so as to achieve the calculated target time.

Also, the step of switching the on-off valve to the full closed state again after elapse of the predetermined time from switching the on-off valve to the full open state may include the steps of:

determining whether or not a change rate of a throttle opening is less than or equal to a predetermined value after bringing the EGR valve into a full open state; and immediately switching the on-off valve to the full closed state without waiting for the elapse of the predetermined time when it is determined that the change rate of the throttle opening is less than or equal to the predetermined value.

In the method for controlling operation of the internal combustion engine according to anyone of the first to fourth aspects of the present invention, the pressure-accumulable operational state may include that a change rate of an accelerator opening is more than or equal to a predetermined value. Alternatively, the pressure-accumulable operational state may include that the accelerator opening is more than or equal to a predetermined value. Instead, the pressure-accumulable operational state may be in a non-EGR operating range.

Advantageous Effects of Invention

According to the present invention, EGR gas of a high pressure and a low oxygen concentration can be confined in the EGR passage. As a result of this, it becomes possible to perform good EGR control also to the first explosion cylinder at the time of restart of the engine, and $NO_x$ contained in the exhaust gas can be further reduced.

Particularly, according to the second to fourth aspects of the present invention, an EGR gas of a higher pressure and a lower oxygen concentration can be temporarily confined in the EGR passage without impairing acceleration feeling according to driver's operation.

When a target time required for switching an on-off valve from a full closed state to a full open state is calculated based on an operational state of the engine, and the on-off valve is switched to the full open state so as to achieve the calculated target time, reduction of an exhaust gas pressure can be suppressed to the minimum, and deterioration of maneuverability can be suppressed. In addition, it becomes possible to confine the EGR gas more reliably in the EGR passage.

In switching the on-off valve to the full open state for a predetermined time and returning to the full closed state again, when the on-off valve is immediately switched to the full closed state in a case where a change rate of a throttle opening is less than or equal to a predetermined value, the EGR gas of the high pressure and the low oxygen concentration can be confined more reliably in the EGR passage.

DESCRIPTION OF EMBODIMENTS

With reference to FIGS. 1 to 9, there will be described in detail some embodiments in which a method for controlling operation of an internal combustion engine according to the present invention is applied to a compression ignition engine. However, the present invention is not limited only to these embodiments, but it is possible to further combine these embodiments as necessary, and to freely change a configuration of the present invention according to a characteristic required for an object to which the present invention applied. For example, the present invention is also effective to a spark ignition engine in which gasoline, alcohol, or LNG (liquefied natural gas), etc. are ignited with a spark plug as fuel.

Figure 1:
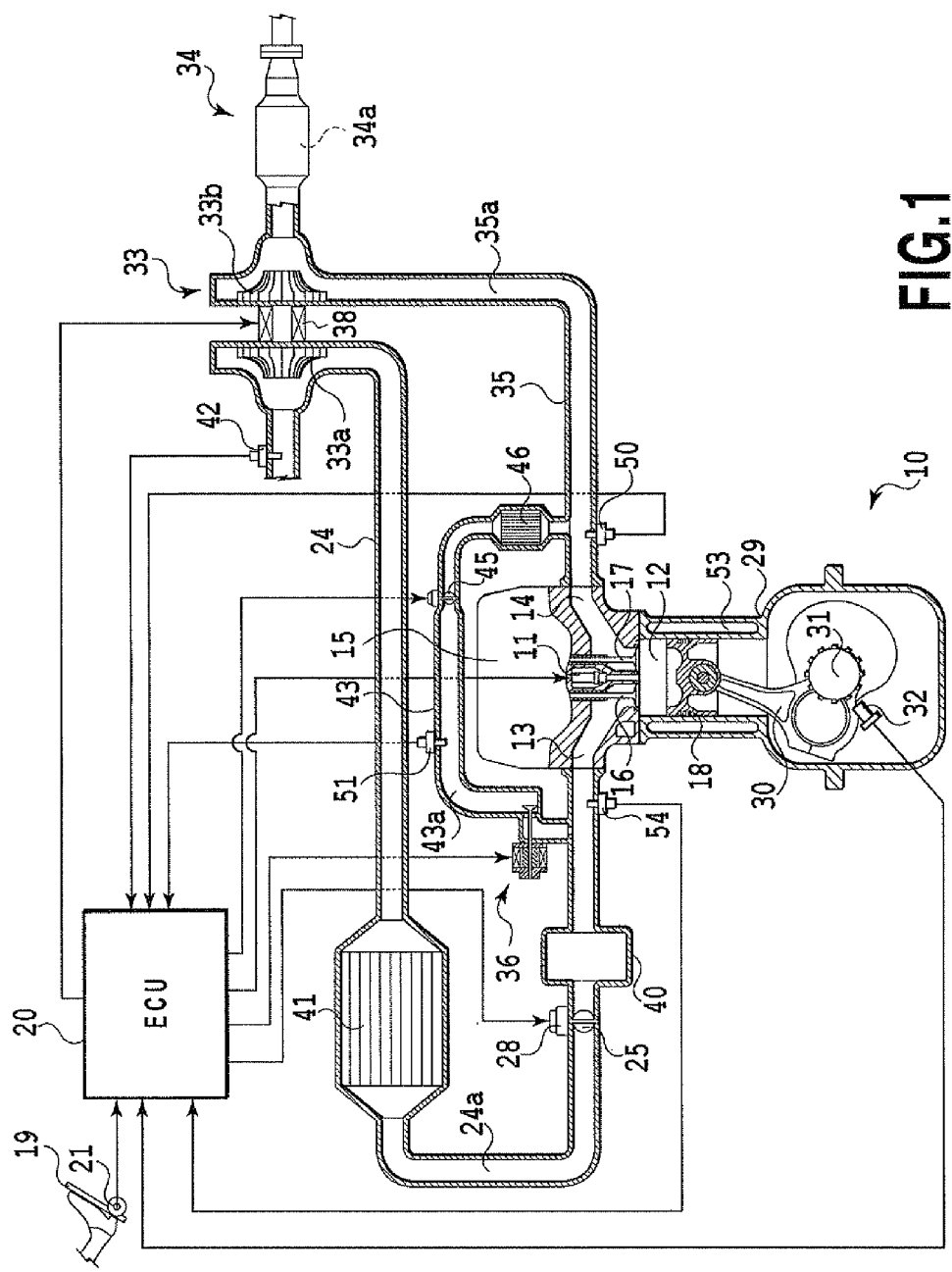
FIG. 1 is a conceptual diagram of an embodiment in which a method for controlling operation of an internal combustion engine according to the present invention is applied to a compression ignition engine 3.
Figure 2:
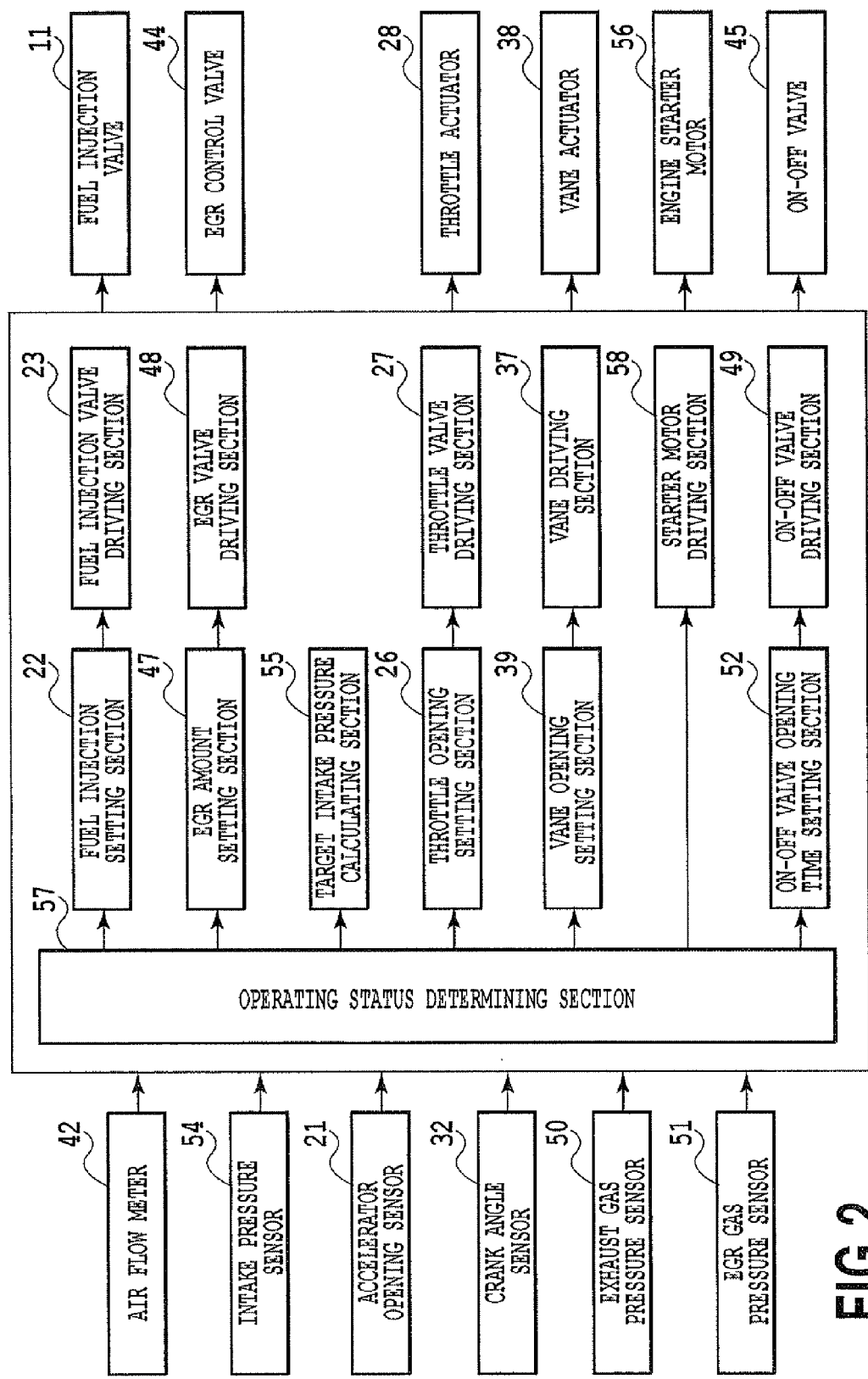
FIG. 2 is a control block diagram in the embodiment shown in FIG. 1.
Figure 3:
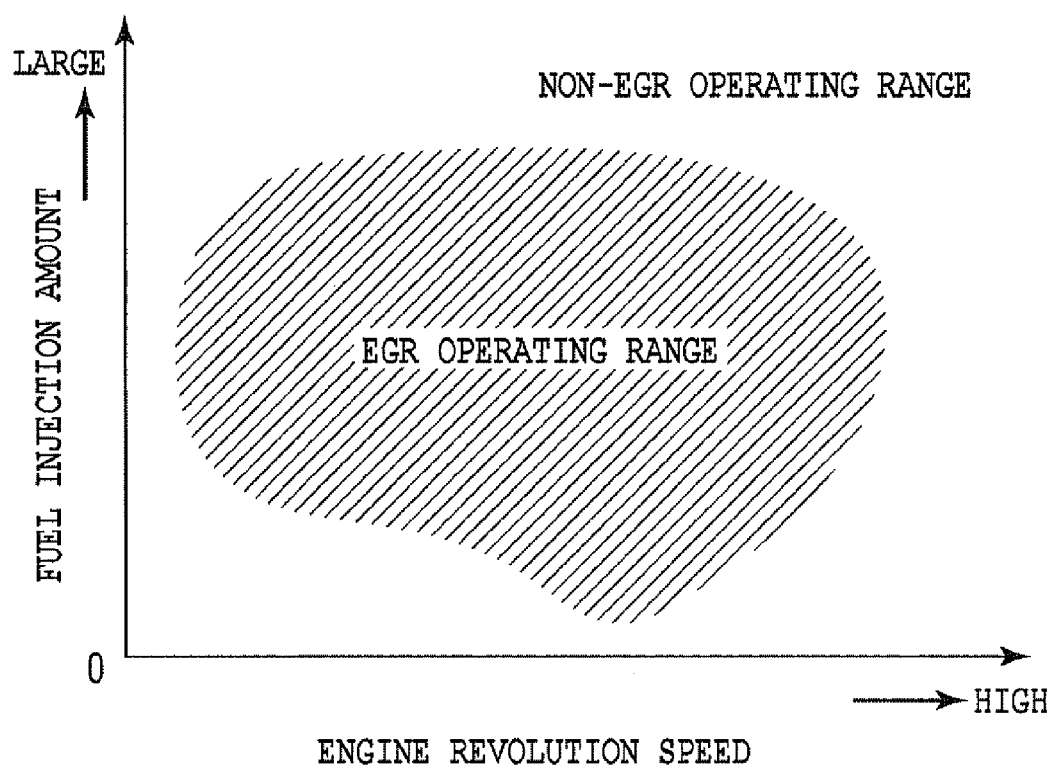
FIG. 3 is a map showing a relation among an engine revolution speed, a fuel injection amount, and an EGR operating range in the embodiment shown in FIG. 1.

A concept of an engine system in the embodiment is shown in FIG. 1, and a control block in this engine system is shown in FIG. 2. Namely, an engine 10 in the embodiment is a multi-cylinder internal combustion engine of the compression ignition system in which spontaneous ignition is performed by directly injecting light oil as fuel from a fuel injection valve 11 into a combustion chamber 12 in a compression state. However, it goes without saying that the present invention can be applied even to a single-cylinder internal combustion engine.

In a cylinder head 15 in which an intake port 13 and an exhaust port 14 respectively facing the combustion chamber 12 are formed, a valve mechanism, which is not shown, and the previously described fuel injection valve 11 are incorporated.

The valve mechanism in the embodiment includes an intake valve 16 that opens and closes the intake port 13 and an exhaust valve 17 that opens and closes the exhaust port 14, and it can change opening and closing timing of the intake valve 16 and the exhaust valve 17 according to an operational state of the engine 10. However, it is also possible to employ a valve mechanism in which opening and closing timing of the intake valve 16 and the exhaust valve 17 is fixed.

The fuel injection valve 11 is arranged facing a center of a top end of the combustion chamber 12 so as to be sandwiched between these valves 16 and 17. The fuel injection valve 11 in the embodiment is a direct-and-single injection type valve in which diesel oil as fuel is directly injected into the combustion chamber 12 before and after the end of a compression stroke, i.e., before and after a compression top dead center of a piston 18. However, it is also possible to employ a multi-injection type valve that injects also in the middle of the compression stroke in addition to the fuel injection in this compression stroke in order to suppress ignition delay.

A fuel amount supplied from the fuel injection valve 11 into the combustion chamber 12 and injection timing are controlled by an ECU (Electronic Control Unit) 20 based on an operational state of a vehicle including a step-on amount of an accelerator pedal 19 by a driver. The step-on amount of the pedal 19 is detected by an accelerator opening sensor 21, and the detection information is output to the ECU 20. More specifically, a fuel injection setting section 22 of the ECU 20 sets driving torque of the engine 10, i.e., a fuel injection amount from the fuel injection valve 11, i.e., a supply amount and injection timing of the fuel based on an operational state of the vehicle including a detection signal from the accelerator sensor 21. A fuel injection valve driving section 23 of the ECU 20 drives the fuel injection valve 11 so that fuel corresponding to the fuel injection amount set by this fuel injection setting section 22 may be injected at the set injection timing.

In the middle of an air intake pipe 24 that is coupled with the cylinder head 15 so as to be communicated with the intake port 13, and that forms an air intake passage 24a along with the intake port 13, a throttle valve 25 for adjusting an opening of the air intake passage 24a is incorporated. An opening of this throttle valve 25 is set at a throttle opening setting section 26 of the ECU 20 based on the step-on amount of the accelerator pedal 19 detected by the accelerator opening sensor 21 and the operational state of the vehicle. Additionally, a throttle valve driving section 27 of the ECU 20 drives the throttle valve 25 through a throttle actuator 28 so that the opening of the throttle valve 25 may be the opening set by this throttle opening setting section 26.

A rotation phase of a crankshaft 31 to which the piston 18 is coupled through a connecting bar 30, i.e., a crank angle sensor 32 that detects a crank angle and outputs this angle to the ECU 20, is attached to a cylinder block 29 in which the piston 18 reciprocates. The ECU 20 grasps at real time the rotation phase of the crankshaft 31 and an engine revolution speed based on information from the crank angle sensor 32.

In the engine 10, assembled are an exhaust turbo charger 33, an exhaust emission control device 34, and an EGR system 36 that returns a part of exhaust gas flowing through an exhaust passage 35a to the air intake passage 24a.

The exhaust turbo charger (hereinafter simply referred to as a turbo charger) 33 is used to perform supercharging to the combustion chamber 12 utilizing kinetic energy of the exhaust gas flowing through the exhaust passage 35a, to increase an intake air density, and to increase an intake air flow rate. A main part of this turbo charger 33 is comprised of a compressor 33a and a turbine 33b that rotates integrally with this compressor 33a. The compressor 33a is incorporated in the middle of the air intake pipe 24 located on a more upstream side than the throttle valve 25. The turbine 33b is incorporated in the middle of an exhaust pipe 35 coupled with the cylinder head 15 so as to be communicated with the exhaust port 14. The turbine 33b in the embodiment includes a variable nozzle vane, which is not shown, whose opening is controlled by a vane driving section 37 of the ECU 20 through a vane actuator 38 (refer to FIG. 2) based on the operational state of the vehicle. Namely, utilization efficiency of the kinetic energy of the exhaust gas is changed by actuating the vane actuator 38 to change the opening of the variable nozzle vane, and as a result, an intake pressure can be changed. Hence, a vane opening setting section 39 of the ECU 20 sets a vane opening of the turbine 33b of the turbo charger 33 based on the operational state of the vehicle. The previously described vane driving section 37 drives the variable nozzle vane through the vane actuator 38 so as to achieve the vane opening set by this vane opening setting section 39.

Since an intake air temperature heated through the compressor 33a by heat transfer from a turbine 33b side exposed to hot exhaust gas, an intercooler 41 is incorporated in the middle of the air intake passage 24a between the compressor 33a and a surge tank 40. In addition, in the air intake pipe 24 located on the more upstream side than the compressor 33a of the turbo charger, provided is an air flow meter 42 that detects a flow rate of an intake air flowing through the air intake passage 24a, and outputs this flow rate to the ECU 20.

The exhaust emission control device 34 for detoxicating toxic substances generated by combustion of an air-fuel mixture in the combustion chamber 12 is arranged in the middle of the exhaust pipe 35 that forms the exhaust passage 35a located on a more downstream side than the turbine 33b of the turbo charger 33. Although the exhaust emission control device 34 in the embodiment has at least an oxidation catalytic converter 34a, it is also possible to add a DPF (Diesel Particulate Filter) and other catalytic converters, such as an $NO_x$ catalyst.

The EGR system 36 planned to reduce nitrogen oxide in the exhaust gas includes: an EGR pipe 43 that forms an EGR passage 43a; an EGR control valve 44 and an on-off valve 45 that are provided spaced apart from each other at this EGR pipe 43; and a heat exchanger 46. One end of the EGR pipe 43 is communicated with the exhaust pipe 35 that forms the exhaust passage 35a along with the exhaust port 14, and also the other end of the EGR pipe 43 is communicated with an inside of the air intake pipe 24 between the above-mentioned throttle valve 25 and the surge tank 40 arranged on the more downstream side than this throttle valve 25.

The EGR valve 44 that is arranged on one end side of the EGR pipe 43 and whose actuation is controlled by the ECU 20, the EGR valve 44 being adjacent to a joining portion of the air intake pipe 24 and the EGR pipe 43, controls a flow rate of exhaust gas as EGR gas recirculated from the EGR passage 43a to the air intake passage 24a. More specifically, when the engine 10 is in an EGR operating range shown with oblique lines of FIG. 3 previously set in relation to an engine revolution speed and a fuel injection amount, an EGR amount setting section 47 of the ECU 20 sets an EGR amount to be recirculated in the combustion chamber 12, i.e., an opening of the EGR valve 44. An EGR valve driving section 48 of the ECU 20 controls the opening of the EGR valve 44 to be the opening set by the EGR amount setting section 47, and in the other cases, the EGR valve driving section 48 basically holds the EGR valve 44 to be closed so as to close the EGR passage 43a.

Opening and closing operations to the EGR passage 43a of the on-off valve 45 arranged on a joining portion side of the exhaust pipe 35 and the EGR pipe 43 are controlled by an on-off valve driving section 49 of the ECU 20. In the embodiment, a time t required for opening the on-off valve 45 can be controlled based on an opening of the variable nozzle vane of the turbo charger 33, a pressure $P_E$ of exhaust gas flowing through the nearest exhaust passage 35a of a joining portion of the exhaust pipe 35 to the other end of the EGR pipe 43, and a pressure $P_e$ of the EGR gas. Hence, provided are an exhaust gas pressure sensor 50 for detecting the pressure $P_E$ of exhaust gas flowing through the nearest exhaust passage 35a of a communicating portion with the other end of the EGR pipe 43, and an EGR gas pressure sensor 51 that is interposed in the EGR passage 43a, and that detects the pressure $P_e$ of the EGR gas. Detection signals from these two sensors 50 and 51 are output to the ECU 20.

Figure 4:
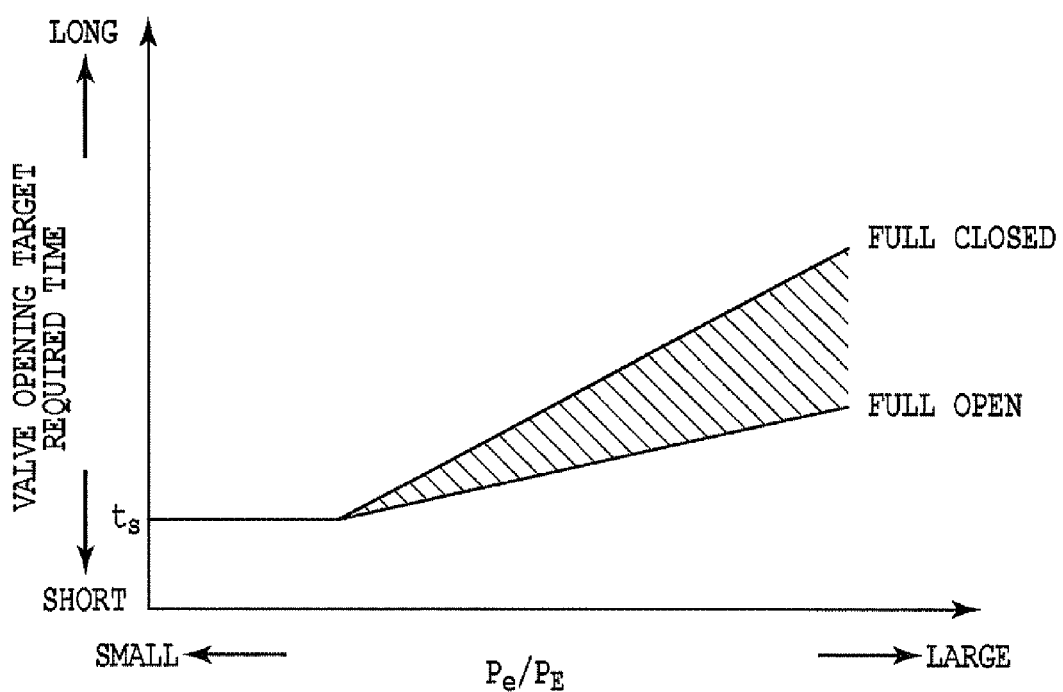
FIG. 4 is a map showing a relation among an engine revolution speed, a fuel injection amount, and a target intake pressure in the embodiment shown in FIG. 1.

It should be noted that when the previously described on-off valve 45 is changed from a valve closed state to a valve opened state, it is feared that actuation of the turbo charger 33 is adversely affected along with rapid change of the exhaust gas pressure $P_E$. Hence, in the embodiment, appropriately set is the time (hereinafter referred to as a valve opening target required time) t required for opening the on-off valve 45 according to the opening of the variable nozzle vane of the turbo charger 33. More specifically, a map on the valve opening target required time t of the on-off valve 45 as shown in FIG. 4 is stored in an on-off valve opening time setting section 52 of the ECU 20. This map is previously set by relating a percentage of the EGR gas pressure $P_e$ detected by the EGR gas pressure sensor 51 and the opening of the variable nozzle vane of the turbo charger 33 to the exhaust gas pressure $P_E$ detected by the exhaust gas pressure sensor 50. The on-off valve opening time setting section 52 outputs to the previously described on-off valve driving section 49 the valve opening target required time t of the on-off valve 45 read from this map, and the on-off valve driving section 49 controls a valve opening speed of the on-off valve 45 so that the on-off valve 45 may become a full open state in the valve opening target required time t. Accordingly, it should be noted that when it is not feared that actuation of the turbo charger 33 is adversely affected by rapid change of the exhaust gas pressure $P_E$, or when the turbo charger 33 is not incorporated in the engine 10, no such control is needed.

In the embodiment, an interval between the EGR valve 44 and the on-off valve 45 and an inner diameter of the EGR passage 43a located between these valves are appropriately set so that an volume of the EGR passage 43a partitioned by the closed EGR valve 44 and the on-off valve 45 may be substantially the same as a displacement of the engine 10. The heat exchanger 46 for reducing a temperature of the exhaust gas flowing into the EGR passage 43a is arranged at the other end side of the EGR pipe 43, i.e., in the middle of the EGR pipe 43 located between the joining portion of the exhaust pipe 35 and the EGR pipe 43, and the on-off valve 45. Cooling water flowing through a water jacket 53 formed in the cylinder block 29 is fed to this heat exchanger 46 to efficiently cool hot exhaust gas, and thereby filling efficiency of the EGR gas fed to the EGR passage 43a is enhanced.

Accordingly, intake air supplied in the combustion chamber 12 along with the exhaust gas recirculated in the air intake passage 24a through the EGR passage 43a forms an air-fuel mixture with fuel injected from the fuel injection valve 11 in the combustion chamber 12. Subsequently, the air-fuel mixture ignites spontaneously and burns just before a compression top dead center of the piston 18, and exhaust gas generated by the above-described burning is discharged in the atmosphere from the exhaust pipe 35 through the exhaust emission control device 34. In this case, since a temperature of combustion gas decreases due to a decreased intake air temperature along with the increase of $CO_2$ concentration contained in the intake air, an amount of nitrogen oxide generated with combustion is suppressed.

In the present invention, when the engine 10 is restarted based on a engine restarting request after the temporary stop of the engine 10 based on an engine stopping request, EGR control can be performed effectively also to a first explosion cylinder. Hence, it is necessary to previously temporarily store exhaust gas of a high pressure and a low oxygen concentration in the EGR passage 43a. As an operational state in which such exhaust gas of the high pressure and the low oxygen concentration can be obtained, i.e., a pressure-accumulable operational state in the present invention, a case where the engine 10 is in a highly-loaded non-EGR operating range can be cited primarily. Furthermore, it can be said that a case where the EGR valve 44 is in a state of being closed even though the engine 10 is in the EGR operating range, and specifically, a case where the step-on amount of the accelerator pedal 19 by the driver rapidly increases are also in the pressure-accumulable operational state in the present invention.

However, in the latter case where a change rate $\alpha_n$ of the accelerator opening is not less than a positive predetermined value $\alpha_R$, when the on-off valve 45 is left to be in the valve opened state, apart of the exhaust gas flows into an EGR passage 43a side. As a result of this, there is fear that rise of driving torque is delayed and acceleration feeling of the driver is impaired due to delay of the rise of the exhaust gas pressure $P_E$. Hence, in the embodiment, the on-off valve 45 is held in the valve closed state until an intake pressure $P_n$ detected by an intake pressure sensor 54 reaches a target intake pressure $P_R$ set from an engine revolution speed and a fuel injection amount. Subsequently, when the intake pressure $P_n$ reaches the target intake pressure $P_R$, the on-off valve 45 is opened, and a part of the exhaust gas is fed to the EGR passage 43a as the EGR gas.

Figure 5:
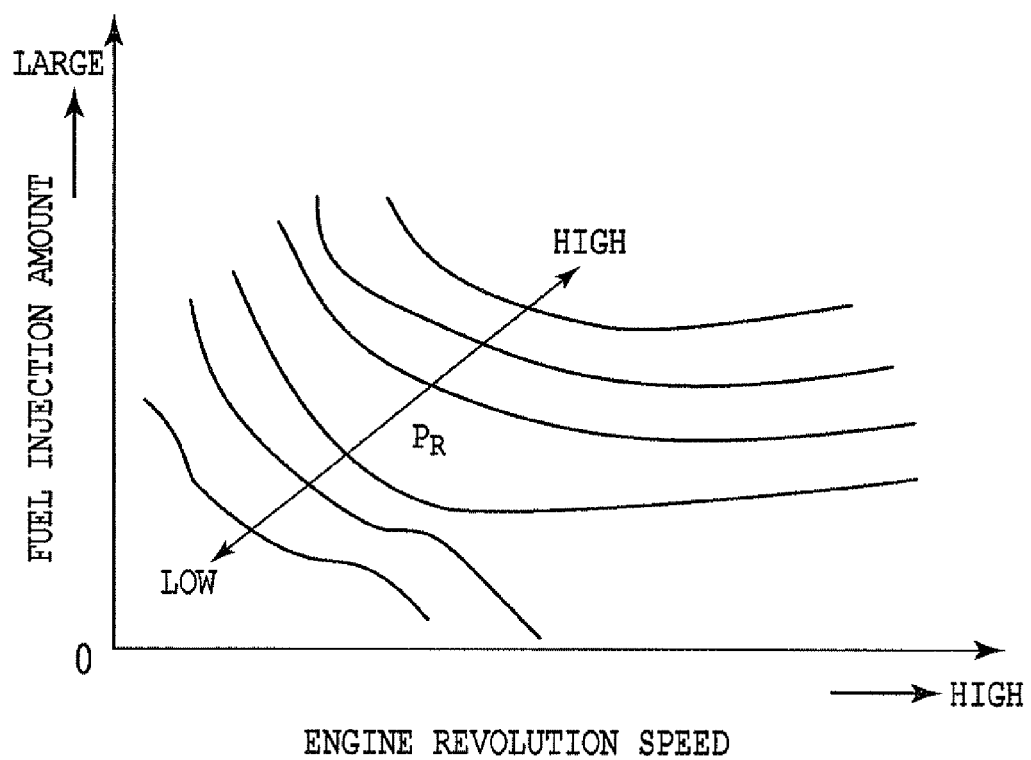
FIG. 5 is a map showing a relation among a ratio of an EGR gas pressure to an exhaust gas pressure, a valve opening target required time of an on-off valve, and an opening of a variable nozzle vane of an exhaust gas turbine type turbo charger with the variable nozzle vane.

The above-mentioned target intake pressure $P_R$ is calculated in a target intake pressure calculating section 55 of the ECU 20. Hence, in the target intake pressure calculating section 55 in the embodiment, stored is a map as shown in FIG. 5 previously set in relation to the engine revolution speed and the fuel injection amount, and the target intake pressure $P_R$ is read based on this map. In addition, the previously described intake pressure sensor 54 is provided in the air intake pipe 24 of the more downstream side than a communicating portion with the EGR pipe 43, and the pressure $P_n$ of the intake air flowing through the air intake pipe 24 is detected and output to the ECU 20.

The "engine stopping request" in the present invention is referred to as a case where the step-on amount of the accelerator pedal 19 has become 0 and a vehicle speed has become 0 during the operation of the engine 10. In addition, the "engine restarting request" in the present invention is referred to as a case where the accelerator pedal 19 has been stepped on by the driver to start the vehicle from a state where the engine 10 is stopped by the "engine stopping request".

The ECU 20 includes a microcomputer including a CPU, a ROM, a RAM, an A/D converter, an input/output interface, etc., which are not shown. The ECU 20 in the embodiment grasps operational states of the engine 10 and of the vehicle on which this engine 10 is mounted based on detection information from the above-mentioned various sensors 21, 32, 50, 51, 54 and the air flow meter 42, etc. Additionally, controlled is actuation of the fuel injection valve 11, the throttle actuator 28, the vane actuator 38, the EGR valve 44, the on-off valve 45 and an engine starter motor 56, which will be described hereinafter, etc. so that the engine 10 may be operated according to the previously set program. Hence, the ECU 20 in the embodiment further includes an operating status determining section 57 and a starter motor driving section 58 in addition to the previously described fuel injection setting section 22, fuel injection valve driving section 23, throttle opening setting section 26, throttle valve driving section 27, vane opening setting section 39, vane driving section 37, EGR amount setting section 47, EGR valve driving section 48, on-off valve driving section 49, on-off valve opening time setting section 52, and target intake pressure calculating section 55.

The operating status determining section 57 grasps the operational states of the vehicle and the engine 10 based on detection information from the accelerator opening sensor 21, the crank angle sensor 32, the exhaust gas pressure sensor 50, the EGR gas pressure sensor 51, the air flow meter 42, the intake pressure sensor 54, etc. In addition, in this operating status determining section 57, presence/absence of the engine stopping request, the engine restarting request, etc. are also determined.

The starter motor driving section 58 controls actuation of the engine starter motor 56 connected to the crankshaft 3 through a joint, which is not shown, based on an ON signal of an ignition key switch, which is not shown, and on the previously described engine restarting request. The engine starter motor 56 performs motoring of the engine 10.

As mentioned above, the ECU 20 temporarily confines the exhaust gas of the high pressure and the low oxygen concentration in the EGR passage 43a as the EGR gas based on the operational state of the vehicle. Subsequently, when the request for an engine starting is performed from the temporary stopped state based on the engine stopping request, the EGR valve 44 is opened together with starting of the engine 10, and effective EGR control is performed from the first explosion cylinder.

Figure 6:
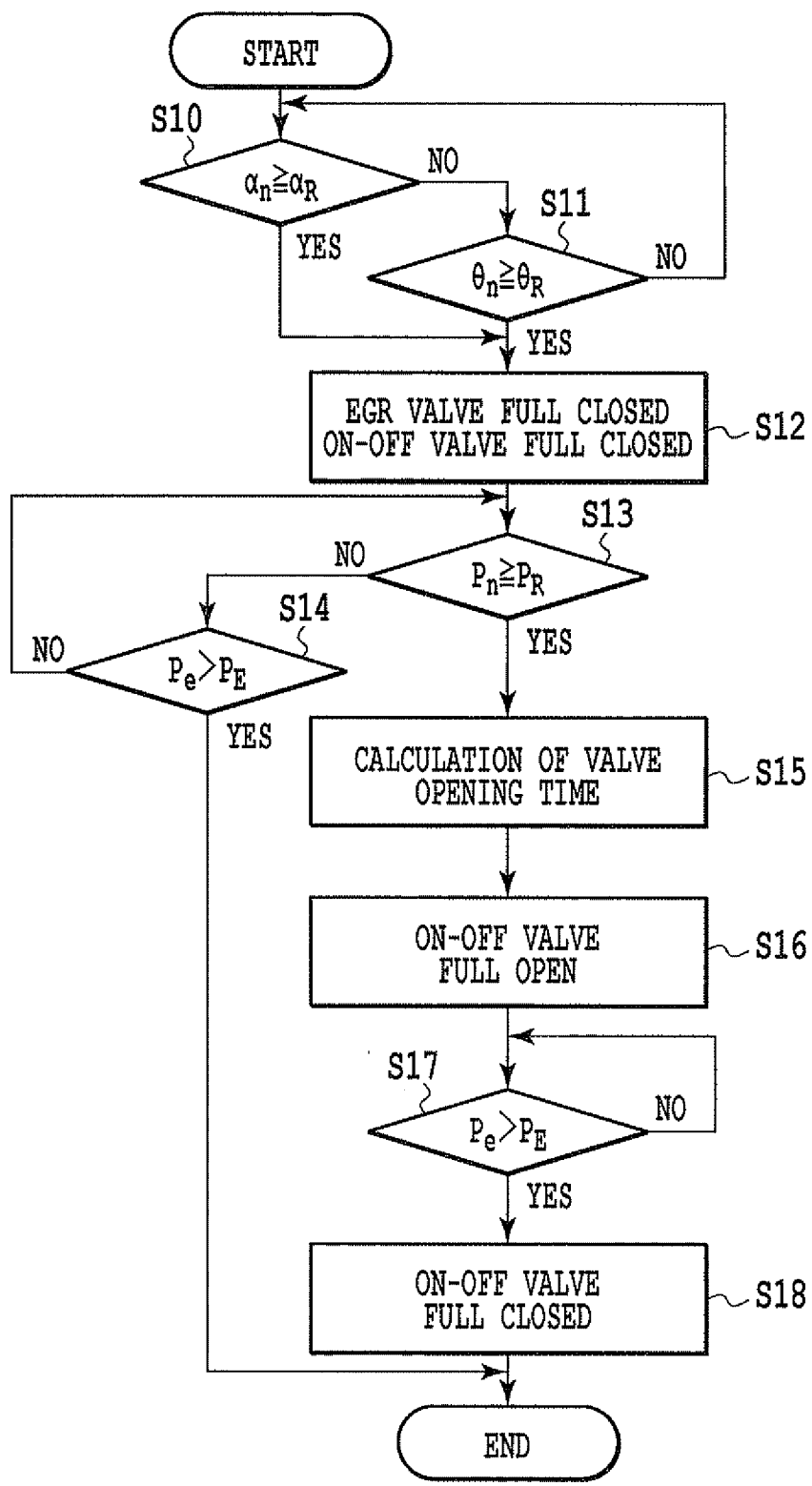
FIG. 6 is a flow chart schematically showing a control flow in the embodiment shown in FIG. 1.
Figure 7:
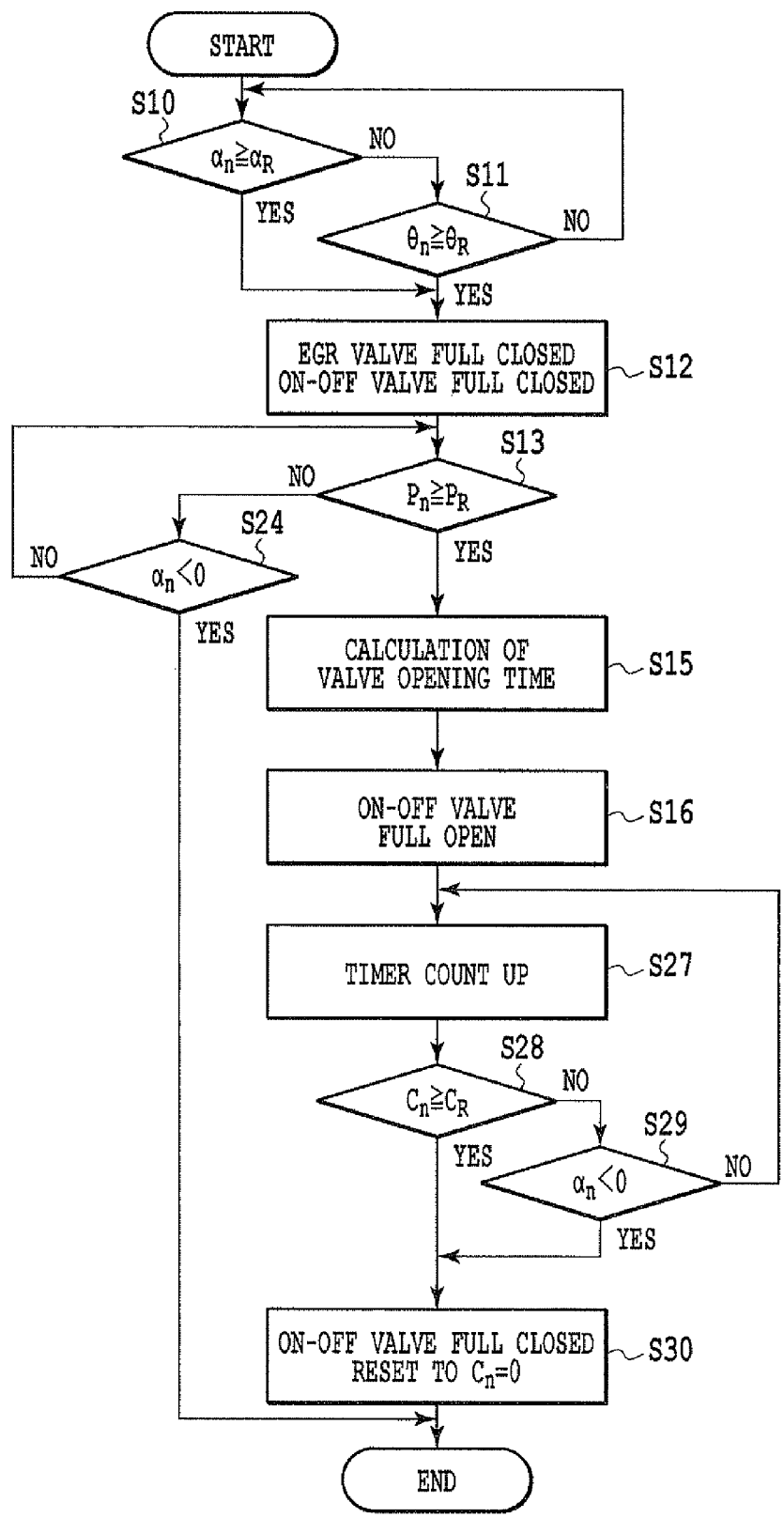
FIG. 7 is a flow chart schematically showing a control flow in other embodiment of the present invention.
Figure 8:
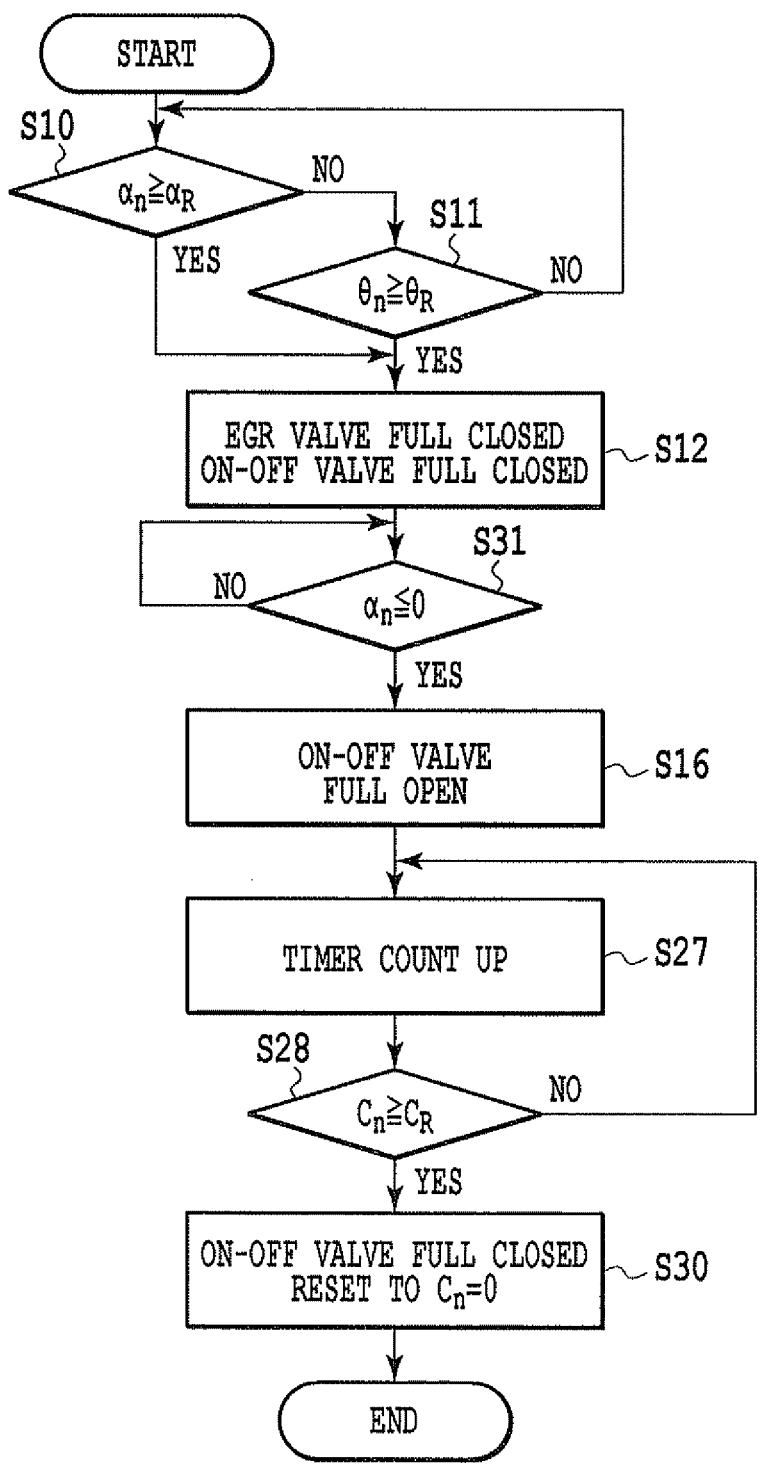
FIG. 8 is a flow chart schematically showing a control flow in another embodiment of the present invention.

A control procedure according to the embodiment for temporarily confining the EGR gas in the EGR passage 43a as described above is performed according to a flow chart shown in FIG. 6. Namely, first, it is determined in step S10 whether or not the change rate $\alpha_n$ of the accelerator opening operated by the driver is more than or equal to the previously set positive threshold $\alpha_R$. Here, when it is determined that the change rate $\alpha_n$ of the accelerator opening is smaller than the threshold $\alpha_R$, i.e., the driver does not request to rapid increase of the driving torque, the program proceeds to step S11, and it is further determined whether or not an accelerator opening $\theta_n$ at this time is more than or equal to a previously set threshold $\theta_R$. When it is determined in this step S11 that the accelerator opening $\theta_n$ is smaller than the threshold $\theta_R$, i.e., the engine 10 is not in the highly-loaded non-EGR operating range, the program returns to step S10, and the above-mentioned operation is repeated again.

When it is determined in step S10 that the change rate $\alpha_n$ of the accelerator opening is more than or equal to the threshold $\alpha_R$, i.e., the engine 10 is in the pressure-accumulable operational state, the program proceeds to step S12, and the EGR valve 44 and the on-off valve 45 are respectively held in the full closed state. In addition, also when it is determined in step S11 that the accelerator opening $\theta_n$ is more than or equal to the threshold $\theta_R$, i.e., the engine 10 is in the highly-loaded non-EGR operating range, which is the pressure-accumulable operational state, the program proceeds to step S12.

Subsequently, it is determined in step S13 whether or not the current intake pressure $P_n$ detected by the intake pressure sensor 54 is more than or equal to the target intake pressure $P_R$ set by the target intake pressure calculating section 55. Here, when it is determined that the intake pressure $P_n$ is less than the target intake pressure $P_R$, i.e., increase of the driving torque according to the change rate $\alpha_n$ of the accelerator opening has not been performed yet, the program proceeds to step S14. In this step S14, it is determined whether or not the EGR gas pressure $P_e$ is higher than the exhaust gas pressure $P_E$ by comparing the EGR gas pressure $P_e$ detected by the EGR gas pressure sensor 51 with the exhaust gas pressure $P_E$ detected by the exhaust gas pressure sensor 50. Here, when it is determined that the EGR gas pressure $P_e$ is less than or equal to the exhaust gas pressure $P_E$, i.e., the pressure $P_E$ of the exhaust gas flowing through the exhaust passage 35a continues to rise, the program returns to step S13, and it is determined again whether or not the intake pressure $P_n$ is more than or equal to the target intake pressure $P_R$.

As described above, unless the pressure $P_E$ of the exhaust gas flowing through the exhaust passage 35a decreases, steps S13 and S14 are repeated until the intake pressure $P_n$ becomes more than or equal to the target intake pressure $P_R$. As a result of this, since the driving torque is increased according to the change rate $\alpha_n$ of the accelerator opening without impairing a driver's acceleration request, deterioration of maneuverability can be avoided.

Meanwhile, when it is determined in step S14 that the EGR gas pressure $P_e$ is higher than the exhaust gas pressure $P_E$, i.e., the pressure $P_E$ of the exhaust gas flowing through the exhaust passage 35a is on the decrease, this processing is completed as it is. The reason is because the EGR gas of the high pressure and the low oxygen concentration cannot be confined in the EGR passage 43a.

When it is determined in the previous step S13 that the intake pressure $P_n$ is more than or equal to the target intake pressure $P_R$, i.e., the driving torque is increased as the driver hopes to, the program proceeds to step S15, and the valve opening target required time t is set by the on-off valve opening time setting section 52. Next, the program proceeds to step S16, and the on-off valve 45 is switched to the full open state in the set valve opening target required time t. Subsequently, it is determined in step S17 whether or not the EGR gas pressure $P_e$ detected by the EGR gas pressure sensor 51 is higher than the exhaust gas pressure $P_E$ detected by the exhaust gas pressure sensor 50. Here, when it is determined that the EGR gas pressure $P_e$ is less than or equal to the exhaust gas pressure $P_E$, i.e., the pressure $P_E$ of the exhaust gas flowing through the exhaust passage 35a continues to rise, step S17 is repeated until the EGR gas pressure $P_e$ becomes higher than the exhaust gas pressure $P_R$. In a manner described above, when it is determined in step S17 that the EGR gas pressure $P_e$ is higher than the exhaust gas pressure $P_E$, i.e., the pressure of the exhaust gas flowing through the exhaust passage 35a begins to decrease, the program proceeds to step S18, and the on-off valve 45 is switched to the full closed state, and then this processing is completed. As described above, unless the pressure of the exhaust gas flowing through the exhaust passage 35a decreases after the on-off valve 45 is opened, the EGR gas of the high pressure and the low oxygen concentration can be temporarily reliably confined in the EGR passage 43a by continuing to open the on-off valve 45. Accordingly, when the engine 10 is restarted according to the engine restarting request after the engine 10 is temporarily stopped according to the engine stopping request, it becomes possible to add the EGR gas of the low oxygen concentration to the intake air also in the first explosion cylinder, thus enabling to reliably suppress generation of $NO_x$.

In the above-mentioned embodiment, although the exhaust gas pressure sensor 50 and the EGR gas pressure sensor 51 are used, it is also possible to perform similar control without using these sensors. A control procedure according to an other embodiment for temporarily confining EGR gas in the EGR passage 43a as described above is shown in a flow chart of FIG. 7, steps S10 to S13 are the same as in the previously described embodiment. When it is determined in step S13 that the current intake pressure $P_n$ is less than the target intake pressure $P_R$, the program proceeds to step S24, and next, it is determined whether or not the change rate $\alpha_n$ of the accelerator opening is less than zero.

When it is determined in step S24 that the change rate $\alpha_n$ of the accelerator opening is more than or equal to zero, i.e. the pressure of the exhaust gas flowing through the exhaust passage 35a continues to rise, the program returns to step S13, and it is determined again whether or not the intake pressure $P_n$ is more than or equal to the target intake pressure $P_R$. As described above, unless the pressure of the exhaust gas flowing through the exhaust passage 35a decreases, steps S13 and S24 are repeated until the intake pressure $P_n$ becomes more than or equal to the target intake pressure $P_R$. As a result of this, since the driving torque is increased according to the change rate $\alpha_n$ of the accelerator opening without impairing the driver's acceleration request, deterioration of maneuverability can be avoided.

Meanwhile, when it is determined in step S24 that the change rate $\alpha_n$ of the accelerator opening is less than zero, i.e. the pressure of the exhaust gas flowing through the exhaust passage 35a is on the decrease, this processing is completed similarly to the determination in step S14 in the previously described embodiment.

In addition, when it is determined in step S13 that the intake pressure $P_n$ is more than or equal to the target intake pressure $P_R$, i.e., the driving torque is increased as the driver hopes to, the same steps S15 and S16 as in the previously described embodiment are performed. Additionally, a timer is counted up in step S27, and it is determined in step S28 whether or not a count value $C_n$ of the timer is more than or equal to a threshold $C_R$. This threshold $C_R$ is a previously set value allowing a time that the exhaust gas flowing through the exhaust passage 35a takes to completely flow in the EGR passage 43a as the EGR gas after the on-off valve 45 is opened. Since the count value $C_n$ is smaller than the threshold $C_R$ at first, the program proceeds to step S29, and it is determined whether or not the change rate $\alpha_n$ of the accelerator opening is less than zero. When it is determined that the change rate $\alpha_n$ of the accelerator opening is more than or equal to zero, i.e. the pressure of the exhaust gas flowing through the exhaust passage 35a continues to rise, the program returns to step S27, the count value $C_n$ of the timer is moved forward, and step S28 is repeated again. In a manner described above, unless the pressure of the exhaust gas flowing through the exhaust passage 35a decreases, steps S27 to 329 are repeated until the count value $C_n$ of the timer becomes more than or equal to the threshold $C_R$. As a result of this, the EGR gas of the high pressure and the low oxygen concentration can be reliably introduced to the EGR passage 43a.

When it is determined in step S28 that the count value $C_n$ is more than or equal to the threshold $C_R$, i.e., a predetermined amount of EGR gas of the high pressure and the low oxygen concentration could be introduced to the EGR passage 43a, the program proceeds to step S30, and the on-off valve 45 is switched to the full closed state. As a result of this, the EGR gas of the high pressure and the low oxygen concentration becomes in a state of being temporarily confined in the EGR passage 43a. Accordingly, when the engine 10 is restarted according to the engine restarting request after the engine 10 is temporarily stopped according to the engine stopping request, it becomes possible to add the EGR gas of the low oxygen concentration to the intake air also in the first explosion cylinder, thus enabling to reliably suppress generation of $NO_x$. In this step S30, processing of resetting the count value $C_n$ of the timer to zero is also performed.

Meanwhile, when it is determined in step S29 that the change rate $\alpha_n$ of the accelerator opening is less than zero, i.e.

the pressure of the exhaust gas flowing through the exhaust passage 35a is on the decrease, the program immediately proceeds to step S30 without waiting for elapse of a predetermined time. As a result of this, a pressure of the EGR gas interposed in the EGR passage 43a that has been risen after the on-off valve 45 is opened can be reliably prevented from decreasing.

In the above-described embodiment, although the on-off valve 45 is closed until the intake pressure $P_n$ reaches the target intake pressure $P_R$ to thereby suppress deterioration of maneuverability, it is also possible to open the on-off valve 45 when the change rate $\alpha_n$ of the accelerator opening becomes negative.

Although a flow chart of the other embodiment of the present invention as described above is shown in FIG. 8, steps S10 to S12 are the same as in the previously described embodiment. After the EGR valve 44 and the on-off valve 45 are respectively held in the full closed state in step S12, the program proceeds to step S31, and it is determined whether or not the change rate $\alpha_n$ of the accelerator opening is less than or equal to zero. Here, when it is determined that the change rate $\alpha_n$ of the accelerator opening is larger than zero, i.e. the pressure of the exhaust gas flowing through the exhaust passage 35a continues to rise, step S31 is repeated until the pressure of the exhaust gas flowing through the exhaust passage 35a does not rise or it decreases. In a manner described above, when it is determined in step S31 that the change rate $\alpha_n$ of the accelerator opening is less than or equal to zero, i.e. the pressure of the exhaust gas flowing through the exhaust passage 35a is stopped rising, or on the decrease, the program proceeds to step S16, and the on-off valve 45 is switched to the full open state. Next, the timer is counted up in step S27, it is determined in step S28 whether or not the count value $C_n$ of the timer is more than or equal to the threshold $C_R$, and steps S27 and S28 are repeated until the count value $C_n$ of the timer becomes more than or equal to the threshold $C_R$.

When it is determined in step S28 that the count value $C_n$ is more than or equal to the threshold $C_R$, i.e., a predetermined amount of EGR gas of a high pressure and a low oxygen concentration could be fed to the EGR passage 43a, the program proceeds to step S30, and the on-off valve 45 is switched to the full closed state. In addition, the count value $C_n$ of the timer is reset to zero. Although complex control as in the previously described embodiment is not performed in the case of the embodiment, it is possible to obtain substantially the same effect as in the previously described embodiment.

Figure 9:
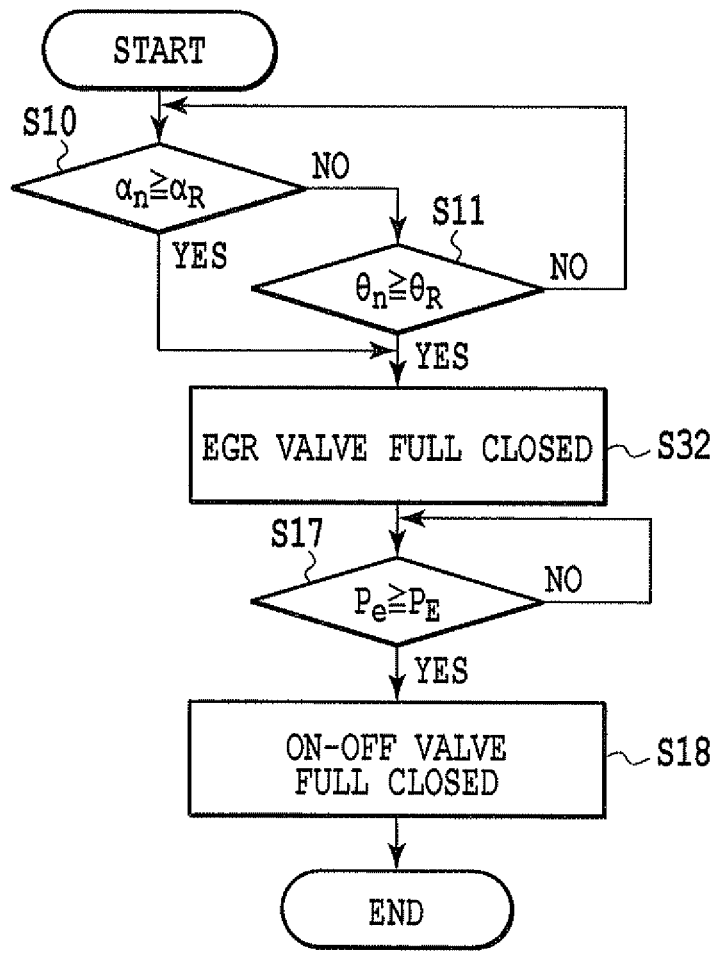
FIG. 9 is a flow chart schematically showing a control flow in still another embodiment of the present invention.

FIG. 9 shows a flow chart of a simple control form using the exhaust gas pressure sensor 50 and the EGR gas pressure sensor 51 as in the first embodiment. Namely, first, it is determined in step S10 whether or not the change rate $\alpha_n$ of the accelerator opening is more than or equal to the threshold $\alpha_R$. Here, when it is determined that the change rate $\alpha_n$ of the accelerator opening is smaller than the threshold $\alpha_R$, i.e., the driver does not request for rapid increase of the driving torque, the program proceeds to step S11, and it is further determined whether or not an accelerator opening $\theta_n$ at this time is more than or equal to a threshold $\theta_R$. When it is determined in this step S11 that the accelerator opening $\theta_n$ is smaller than the threshold θR, i.e., the engine 10 is not in the highly-loaded non-EGR operating range, the program returns to step S10, and the above-mentioned operation is repeated again.

When it is determined in step S10 that the change rate $\alpha_n$ of the accelerator opening is more than or equal to the threshold $\alpha_R$, i.e., the engine 10 is in the pressure-accumulable operational state, the program proceeds to step S32, and the EGR valve 44 is held in the full closed state. In addition, also when it is determined in step S11 that the accelerator opening $\theta_n$ is more than or equal to the threshold $\theta_R$, i.e., the engine 10 is in the highly-loaded non-EGR operating range, which is the pressure-accumulable operational state, the program proceeds to step S32.

Subsequently, it is determined in step S17 whether or not the EGR gas pressure $P_e$ is more than or equal to the exhaust gas pressure $P_E$. Here, when it is determined that the EGR gas pressure $P_e$ is larger than the exhaust gas pressure $P_E$, i.e., the pressure of the exhaust gas flowing through the exhaust passage 35a continues to rise, step S17 is repeated until the pressure of the exhaust gas flowing through the exhaust passage 35a does not rise or it decreases. In a manner described above, when it is determined in step S17 that the EGR gas pressure $P_e$ is more than or equal to the exhaust gas pressure $P_E$, i.e., the pressure of the exhaust gas flowing through the exhaust passage 35a is stopped rising, or on the decrease, the program proceeds to step S18, and the on-off valve 95 is switched to the full closed state. As a result of this, the EGR gas of the high pressure and the low oxygen concentration can be reliably introduced to the EGR passage 43a.

It should be noted that, the present invention should be interpreted based only upon the matters described in claims, and in the aforementioned embodiments, all changes and modifications included within the spirit of the present invention can be made other than the described matters. That is, all the matters in the described embodiments are made not to limit the present invention, but can be arbitrarily changed according to the application, the object and the like, including every construction having no direct relation to the present invention.

REFERENCE SIGNS LIST

10 ENGINE
11 FUEL INJECTION VALVE
12 COMBUSTION CHAMBER
13 INTAKE PORT
14 EXHAUST PORT
15 CYLINDER HEAD
16 INTAKE VALVE
17 EXHAUST VALVE
18 PISTON
19 ACCELERATOR PEDAL
20 ECU
21 ACCELERATOR OPENING SENSOR
22 FUEL INJECTION SETTING SECTION
23 FUEL INJECTION VALVE DRIVING SECTION
24 AIR INTAKE PIPE
24a AIR INTAKE PASSAGE
25 THROTTLE VALVE
26 THROTTLE OPENING SETTING SECTION
27 THROTTLE VALVE DRIVING SECTION
28 THROTTLE ACTUATOR
29 CYLINDER BLOCK
30 CONNECTING ROD
31 CRANK SHAFT
32 CRANK ANGLE SENSOR
33 EXHAUST TURBOCHARGER
33a COMPRESSOR
33b EXHAUST TURBINE
34 EXHAUST EMISSION CONTROL DEVICE
34a OXIDATION CATALYTIC CONVERTER
35 EXHAUST PIPE
35a EXHAUST PASSAGE
36 EGR SYSTEM

37 VANE DRIVING SECTION
38 VANE ACTUATOR
39 VANE OPENING SETTING SECTION
40 SURGE TANK
41 INTERCOOLER
42 AIRFLOW METER
43 EGR PIPE
43a EGR PASSAGE
44 EGR CONTROL VALVE
45 ON-OFF VALVE
46 HEAT EXCHANGER
47 EGR RATE SETTING SECTION
48 EGR VALVE DRIVING SECTION
49 ON-OFF VALVE DRIVING SECTION
50 EXHAUST GAS PRESSURE SENSOR
51 EGR GAS PRESSURE SENSOR
52 ON-OFF VALVE OPENING TIME SETTING SECTION
53 WATER JACKET
54 INTAKE PRESSURE SENSOR
55 TARGET INTAKE PRESSURE CALCULATING SECTION
56 ENGINE STARTER MOTOR
57 OPERATING STATUS DETERMINING SECTION
58 STARTER MOTOR DRIVING SECTION

The invention claimed is:

1. A method for controlling operation of an internal combustion engine in which the engine is temporarily stopped according to a request for a stop to the engine having an exhaust gas recirculation system incorporated therein, and the engine is started again according to a request for a start to the engine, wherein the exhaust gas recirculation system includes: an EGR passage for recirculating a part of exhaust gas discharged from the engine to an air intake passage as EGR gas, one end of the EGR passage being communicated with the air intake passage and the other end thereof being communicated with an exhaust passage; an EGR control valve arranged on one end side of the EGR passage for controlling a flow rate of the EGR gas flowing through the EGR passage; and an on-off valve arranged on the other end side of the EGR passage for opening and closing the EGR passage, the method comprising the steps of:
determining whether or not the engine is in a pressure-accumulable operational state in which the EGR gas is pressure-accumulated in the EGR passage between the EGR valve and the on-off valve;
bringing the EGR valve into a full closed state when it is determined that the engine is in the pressure-accumulable operational state;
comparing a pressure of exhaust gas interposed in the exhaust passage to be led to the EGR passage, and a pressure of the EGR gas interposed in the EGR passage between the EGR valve and the on-off valve after bringing the EGR valve into the full closed state; and
bringing the on-off valve into the full closed state when the pressure of the exhaust gas interposed in the exhaust passage to be led to the EGR passage becomes lower than the pressure of the EGR gas interposed in the EGR passage between the EGR valve and the on-off valve.

2. A method for controlling operation of an internal combustion engine in which the engine is temporarily stopped according to a request for a stop to the engine having an exhaust gas recirculation system incorporated therein, and the engine is started again according to a request for a start to the engine, wherein the exhaust gas recirculation system includes: an EGR passage for recirculating a part of exhaust gas discharged from the engine to an air intake passage as EGR gas, one end of the EGR passage being communicated with the air intake passage and the other end thereof being communicated with an exhaust passage; an EGR control valve arranged on one end side of the EGR passage for controlling a flow rate of the EGR gas flowing through the EGR passage; and an on-off valve arranged on the other end side of the EGR passage for opening and closing the EGR passage, the method comprising the steps of:
determining whether or not the engine is in a pressure-accumulable operational state in which the EGR gas is pressure-accumulated in the EGR passage between the EGR valve and the on-off valve;
bringing the EGR valve into a full closed state when it is determined that the engine is in the pressure-accumulable operational state;
determining whether or not a change rate of an accelerator opening is less than or equal to a predetermined value after bringing the EGR valve into the full closed state; and
bringing the on-off valve into the full closed state when it is determined that the change rate of the accelerator opening is less than or equal to the predetermined value.

3. A method for controlling operation of an internal combustion engine in which the engine is temporarily stopped according to a request for a stop to the engine having an exhaust gas recirculation system incorporated therein, and the engine is started again according to a request for a start to the engine, wherein the exhaust gas recirculation system includes: an EGR passage for recirculating a part of exhaust gas discharged from the engine to an air intake passage as EGR gas, one end of the EGR passage being communicated with the air intake passage and the other end thereof being communicated with an exhaust passage; an EGR control valve arranged on one end side of the EGR passage for controlling a flow rate of the EGR gas flowing through the EGR passage; and an on-off valve arranged on the other end side of the EGR passage for opening and closing the EGR passage, the method comprising the steps of:
determining whether or not the engine is in a pressure-accumulable operational state in which the EGR gas is pressure-accumulated in the EGR passage between the EGR valve and the on-off valve;
bringing the EGR valve and the on-off valve into a full closed state, respectively when it is determined that the engine is in the pressure-accumulable operational state;
determining whether or not a change rate of an accelerator opening is less than or equal to a predetermined value after bringing the EGR valve and the on-off valve into the full closed state;
switching the on-off valve to a full open state when it is determined that the change rate of the accelerator opening is less than or equal to the predetermined value; and
switching the on-off valve to the full closed state again after elapse of a predetermined time from switching the on-off valve to the full open state.

4. A method for controlling operation of an internal combustion engine in which the engine is temporarily stopped according to a request for a stop to the engine having an exhaust gas recirculation system incorporated therein, and the engine is started again according to a request for a start to the engine, wherein the exhaust gas recirculation system includes: an EGR passage for recirculating a part of exhaust gas discharged from the engine to an air intake passage as EGR gas, one end of the EGR passage being communicated with the air intake passage and the other end thereof being communicated with an exhaust passage; an EGR control valve arranged on one end side of the EGR passage for controlling a flow rate of the EGR gas flowing through the EGR passage; and an on-off valve arranged on the other end side of the EGR passage for opening and closing the EGR passage, the method comprising the steps of:

determining whether or not the engine is in a pressure-accumulable operational state in which the EGR gas is pressure-accumulated in the EGR passage between the EGR valve and the on-off valve;

bringing the EGR valve and the on-off valve into a full closed state, respectively when it is determined that the engine is in the pressure-accumulable operational state;

setting a target value of an intake pressure transmitted from the air intake passage to the engine based on an operational state of the engine;

comparing the intake pressure transmitted from the air intake passage to the engine and the set target value of the intake pressure;

switching the on-off valve to a full open state when the intake pressure transmitted from the air intake passage to the engine is more than or equal to the set target value of the intake pressure after bringing the EGR valve and the on-off valve into the full closed state; and switching the on-off valve to the full closed state again after elapse of a predetermined time from switching the on-off valve to the full open state.

5. The method for controlling operation of the internal combustion engine as claimed in claim 3, wherein
the step of switching the on-off valve in the full closed state to the full open state includes the steps of:
calculating a target time required for switching the full closed state to the full open state of the on-off valve based on an operational state of the engine; and
switching the on-off valve to the full open state so as to achieve the calculated target time.

6. The method for controlling operation of the internal combustion engine as claimed in claim 4, wherein
the step of switching the on-off valve in the full closed state to the full open state includes the steps of:
calculating a target time required for switching the full closed state to the full open state of the on-off valve based on an operational state of the engine; and
switching the on-off valve to the full open state so as to achieve the calculated target time.

7. The method for controlling operation of the internal combustion engine as claimed in claim 3, wherein
the step of switching the on-off valve to the full closed state again after elapse of the predetermined time from switching the on-off valve to the full open state includes the steps of:
determining whether or not a change rate of an accelerator opening is less than or equal to a predetermined value after bringing the on-off valve into a full open state; and
immediately switching the on-off valve to the full closed state without waiting for the elapse of the predetermined time when it is determined that the change rate of the accelerator opening is less than or equal to the predetermined value.

8. The method for controlling operation of the internal combustion engine as claimed in claim 4, wherein
the step of switching the on-off valve to the full closed state again after elapse of the predetermined time from switching the on-off valve to the full open state includes the steps of:
determining whether or not a change rate of an accelerator opening is less than or equal to a predetermined value after bringing the on-off valve into a full open state; and
immediately switching the on-off valve to the full closed state without waiting for the elapse of the predetermined time when it is determined that the change rate of the accelerator opening is less than or equal to the predetermined value.

9. The method for controlling operation of the internal combustion engine as claimed in claim 1, wherein the pressure-accumulable operational state includes that a change rate of an accelerator opening is more than or equal to a predetermined value.

10. The method for controlling operation of the internal combustion engine as claimed in claim 2, wherein the pressure-accumulable operational state includes that a change rate of an accelerator opening is more than or equal to a predetermined value.

11. The method for controlling operation of the internal combustion engine as claimed in claim 3, wherein the pressure-accumulable operational state includes that a change rate of an accelerator opening is more than or equal to a predetermined value.

12. The method for controlling operation of the internal combustion engine as claimed in claim 4, wherein the pressure-accumulable operational state includes that a change rate of an accelerator opening is more than or equal to a predetermined value.

13. The method for controlling operation of the internal combustion engine as claimed in claim 1, wherein the pressure-accumulable operational state includes that the accelerator opening is more than or equal to a predetermined value.

14. The method for controlling operation of the internal combustion engine as claimed in claim 2, wherein the pressure-accumulable operational state includes that the accelerator opening is more than or equal to a predetermined value.

15. The method for controlling operation of the internal combustion engine as claimed in claim 3, wherein the pressure-accumulable operational state includes that the accelerator opening is more than or equal to a predetermined value.

16. The method for controlling operation of the internal combustion engine as claimed in claim 4, wherein the pressure-accumulable operational state includes that the accelerator opening is more than or equal to a predetermined value.

17. The method for controlling operation of the internal combustion engine as claimed in claim 1, wherein the pressure-accumulable operational state is in a non-EGR operating range.

18. The method for controlling operation of the internal combustion engine as claimed in claim 2, wherein the pressure-accumulable operational state is in a non-EGR operating range.

19. The method for controlling operation of the internal combustion engine as claimed in claim 3, wherein the pressure-accumulable operational state is in a non-EGR operating range.

20. The method for controlling operation of the internal combustion engine as claimed in claim 4, wherein the pressure-accumulable operational state is in a non-EGR operating range.

* * * * *